United States Patent [19]

Cook

[11] Patent Number: 4,479,185
[45] Date of Patent: Oct. 23, 1984

[54] APPARATUS FOR GENERATING A LEAD SIGNAL IN AN ANTISKID SYSTEM

[75] Inventor: Robert D. Cook, Valencia, Calif.

[73] Assignee: Crane Co., Chicago, Ill.

[21] Appl. No.: 475,039

[22] Filed: Mar. 14, 1983

Related U.S. Application Data

[63] Continuation-in-part of Ser. No. 359,819, Mar. 19, 1982, abandoned, which is a continuation of Ser. No. 146,614, May 5, 1980, abandoned.

[51] Int. Cl.³ .................... B60T 8/00; G06F 15/20
[52] U.S. Cl. .................................... 364/426; 303/95; 303/109
[58] Field of Search .............. 364/426; 303/91, 95, 303/97, 99, 105, 106, 109; 188/181 C

[56] References Cited

U.S. PATENT DOCUMENTS

| | | | |
|---|---|---|---|
| 3,614,173 | 10/1971 | Branson | 188/181 C X |
| 3,669,508 | 6/1972 | Attri | 303/91 |
| 3,729,234 | 4/1973 | Hirzel | 303/109 |
| 3,843,208 | 10/1974 | Jones | 303/91 |
| 4,036,536 | 7/1977 | Quon | 303/97 X |
| 4,068,903 | 1/1978 | Straub | 303/99 |
| 4,180,223 | 12/1979 | Amberg | 303/106 X |

Primary Examiner—Gary Chin
Attorney, Agent, or Firm—Willian, Brinks, Olds, Hofer, Gilson & Lione Ltd.

[57] ABSTRACT

An antiskid braking system includes an improved lead apparatus for generating a lead signal to provide lead compensation. According to this invention, the gain of the apparatus is made to vary as a function of a signal, such as the brake control signal generated by the antiskid system, which is indicative of the coefficient of braking under severe braking conditions. Preferably the gain of the lead apparatus is varied independently of the gains of other elements of the antiskid system, such as the modulator, for example.

21 Claims, 6 Drawing Figures

APPARATUS FOR GENERATING A LEAD SIGNAL IN AN ANTISKID SYSTEM

IDENTIFICATION OF RELATED APPLICATIONS

This application is a continuation in part of copending application Ser. No. 359,819, filed Mar. 19, 1982, now abandoned which is in turn a continuation of application Ser. No. 146,614, filed May 5, 1980 now abandoned.

BACKGROUND OF THE INVENTION

This invention relates to an improved apparatus for generating a lead signal in an antiskid braking system.

Antiskid systems have in the past been provided with lead networks to improve braking efficiency. Such lead networks are responsive to a time derivative of a signal and act to anticipate behavior of the braked wheel. For example, in response to a sharply decelerating wheel, a lead network acts to reduce brake pressure and to arrest the wheel deceleration and prevent wheel skids.

SUMMARY OF THE INVENTION

The present invention is directed to an improved apparatus for generating lead signal in an antiskid system.

According to this invention, the apparatus is provided with a gain which varies as a function of a first signal (such as of a brake control signal, for example) which varies as a function of the braking coefficient, at least under severe braking conditions. Thus, for example, the apparatus can be designed to have a high gain when a brake control signal indicates a small brake pressure reduction (and consequently a high coefficient of friction between the tire and the supporting surface) and a low gain when the brake control signal indicates a large brake pressure reduction (and consequently a low coefficient of friction). In this manner the gain of the lead apparatus can be tailored to fit the prevailing braking conditions. Preferably, the lead gain is varied as a function of the first signal, and other components of the antiskid system, such as the modulator, can be operated at an independent gain.

The invention, together with further objects and attendant advantages, will be best understood by reference to the following detailed description taken in connection with the accompanying drawings.

DETAILED DESCRIPTION OF THE PRESENTLY PREFERRED EMBODIMENTS

Figure 1:
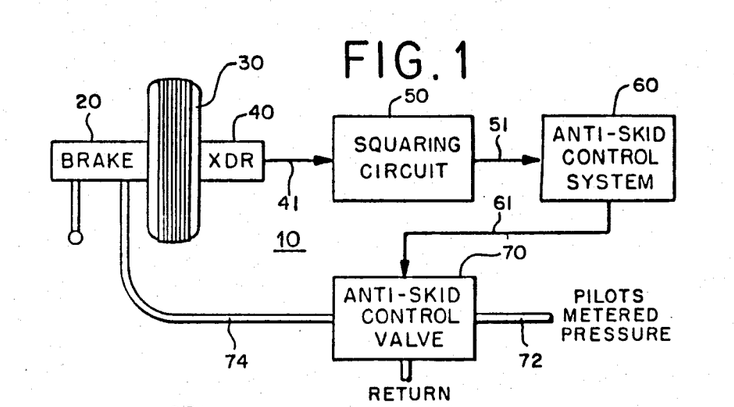
FIG. 1 is a block diagram of a brake control system including an antiskid control system.

Referring now to the drawings, preferred embodiments of the improved lead network of the present invention will be described in connection with the brake control system shown in FIGS. 1 and 2. FIG. 1 shows the major components of an antiskid brake control system 10 which provides brake control for the brake 20 of a rotatable wheel 30. The system 10 includes a wheel-speed transducer 40 which produces a sinusoidal signal on line 41 having a frequency proportional to the angular velocity of the wheel 30. The signal on line 41 is shaped in a squaring circuit 50 and is then supplied as a wheel speed signal to an antiskid control system 60 via line 51. The antiskid control system 60 monitors the wheel signal on line 51. When the wheel signal indicates that the wheel 30 is about to go into a skid due to excessive braking force, the antiskid system 60 generates a brake control signal on line 61. The antiskid control valve 70 is positioned in the brake line 72 which supplies brake fluid under pressure to the brake 20, and the valve 70 operates in response to the signal on line 61 to reduce the brake pressure applied to the brake 20.

In this preferred embodiment, the brake pressure in line 72 is the metered pressure determined by the vehicle operator by means of conventional hydraulic controls. As long as the wheel 30 is not braked so severely as to go into a skid, the full metered pressure in the line 72 is passed by the valve 70 via the line 74 to the brake 20. However, if the metered brake pressure exceeds the skid threshold and drives the wheel 30 into a skid, the antiskid system 60 will generate a brake control signal on line 61 which causes the valve 70 to reduce the pressure in the line 74 to a value less than the metered pressure. By reducing the pressure applied to the brake 30, the braking torque is reduced and the wheel 30 is prevented from skidding.

Figure 2:
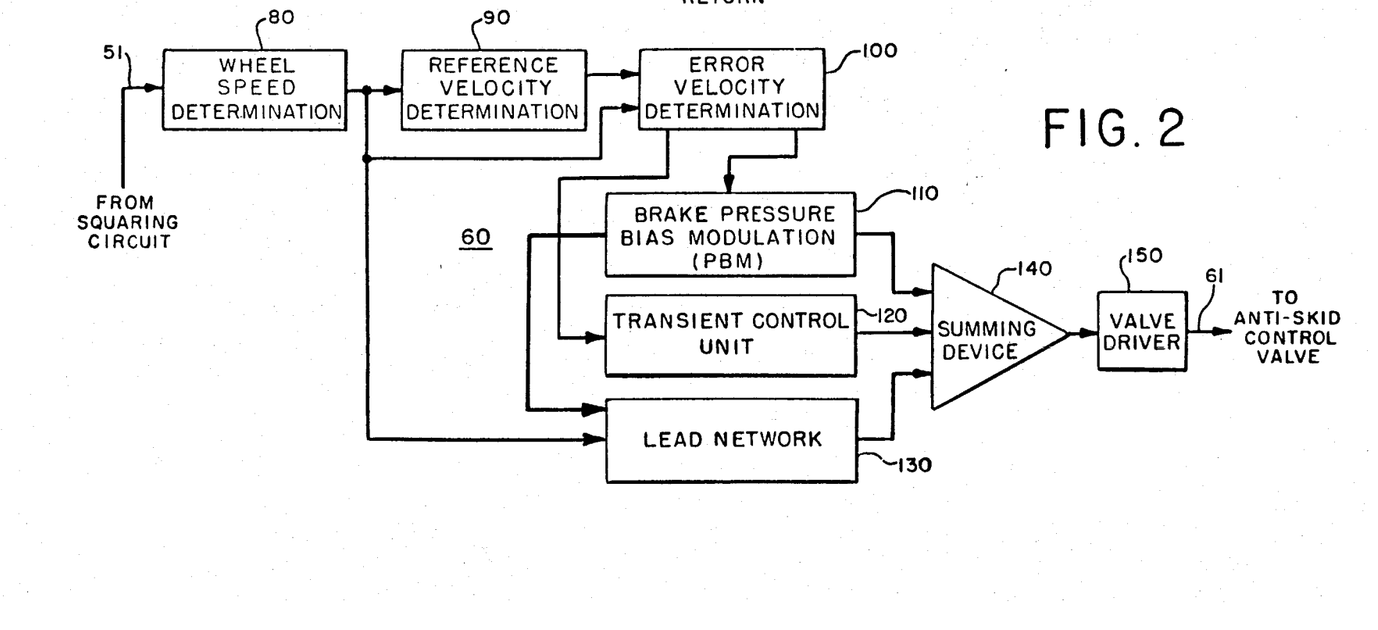
FIG. 2 is a detailed block diagram of the functional components of the antiskid control system of FIG. 1.

FIG. 2 shows a schematic representation of the antiskid system 60 of FIG. 1, including a wheel speed determination unit 80 which uses the wheel signal on line 51 as an input and generates an output signal representative of measured wheel speed. This wheel speed signal is supplied as an input to a reference velocity determination unit 90 for generating a reference velocity signal. This reference velocity signal is applied as an input to an apparatus 100 for determining an error velocity signal representative of the difference between the measured wheel speed signal and the reference velocity signal. The error velocity signal is applied as an input to two separate control units: the brake pressure bias modulation unit, or modulator 110, and the transient control unit 120.

The modulator 110 integrates the error velocity signal over time to arrive at a time averaged, modulated signal representative of the optimum braking pressure. The signal is smoothly and continuously modulated either to increase or to decrease the applied brake pressure as needed in order substantially to prevent excessive wheel skidding while maintaining a high, effective level of braking.

Because the output of the modulator 110 is a time integral function of the error velocity signal, it will on occasion be unable to respond quickly enough to prevent a wheel skid. For example, when a braked wheel suddenly enters a tar strip or an ice patch or a wet surface, the skid threshold will abruptly fall and the modulator 110 may be unable to prevent a deep skid if the wheel 30 is heavily braked. Under these conditions, the transient control unit 120 responds to a large error velocity signal by commanding a sharp and sudden reduction in applied brake pressure.

The wheel speed signal is also applied as an input to a lead network 130 which responds to changes in the wheel speed signal to anticipate trends and to command an early modification in brake pressure to anticipate skids.

Outputs from the modulator 110, the transient control unit 120, and the lead network 130 are summed in a summing device 140 to produce a brake control signal which is amplified by the valve driver 150 and then applied as a control signal via line 61 to the antiskid control valve.

The foregoing description of the brake control system 10 is provided to set forth the environment of preferred embodiments of the lead signal generating apparatus of this invention. With the exception of the lead network 130, individual components of this environment do not form a part of the present invention, and for that reason will not be described in detail here. Furthermore, those skilled in the art are familiar with various forms of these components. For example, one form of the wheel speed determination unit 80, the error velocity determination unit 100, the modulator 100, and the transient control unit 120 is shown in U.S. Pat. No. 3,724,916, issued Apr. 3, 1973 to Edgar A. Hirzel, and entitled "Controlled Wheel Braking System". Alternate embodiments of these elements are disclosed in U.S. Pat. No. 4,338,670, issued July 6, 1982 to Thomas Skarvada. Other forms of the wheel speed determination unit 80 are described in U.S. Pat. No. 4,056,287, issued Nov. 1, 1977 to Wolfgang Gudat; and in U.S. Pat. No. 4,125,295, issued Nov. 14, 1978 to Gerhard Ruhnam, et al.

THE FIRST PREFERRED EMBODIMENT

The present invention is directed to an improved lead network for a brake control system. A first presently preferred embodiment of this invention, included in lead network 130 of FIG. 2, will be described in conjunction with the flow charts of FIGS. 3-5.

This embodiment of this invention is implemented as a programmed microprocessor. The presently preferred microprocessor is a Z-80 CPU manufactured by Zilog, Inc., Cupertino, Calif. The program is presented in flow chart form in FIGS. 3-5 and is listed in assembly language form in Tables I-IV.

This program is executed periodically (203 times each second in the preferred embodiment) to determine first and second order lead signals. These lead signals are then added to signals produced by the modulator 110 and the transient control 120, and the sum is used to control the valve driver 150.

As mentioned earlier, the lead network can be used with a wide variety of brake control systems. This preferred embodiment utilizes three dynamic variables generated by the remainder of the brake control system.

First, this preferred embodiment accepts as an input the three most recent measurements of wheel velocity, which are labeled VELOC1, VELOC2, and VELOC3 in the listings. Here, VELOC1 is the most recently measured wheel velocity; VELOC2 is the wheel velocity measured in the last cycle, 1/203 of a second before VELOC1; and VELOC3 is the wheel velocity measured in the next to last cycle, 2/203 of a second before VELOC1.

Second, this embodiment accepts as an input the output signal of the modulator, labeled PBM in the listings. Here, modulator output corresponds generally to the average level of brake pressure applied to the brake 20. Thus, a high modulator output corresponds to a high coefficient of friction between the wheel 30 and the pavement. In practice, the antiskid valve 70 is generally designed to require a large current to bring about a large reduction in brake pressure and therefore the driver 150 is designed to invert the signal from the summing device 140 prior to amplification to obtain the desired relationship between modulator signal and valve control signal.

Third, this embodiment accepts as an input a signal COMPOS, which is related to the sum of the signals produced by the modulator 110 and the transient control unit 120.

Figure 3:
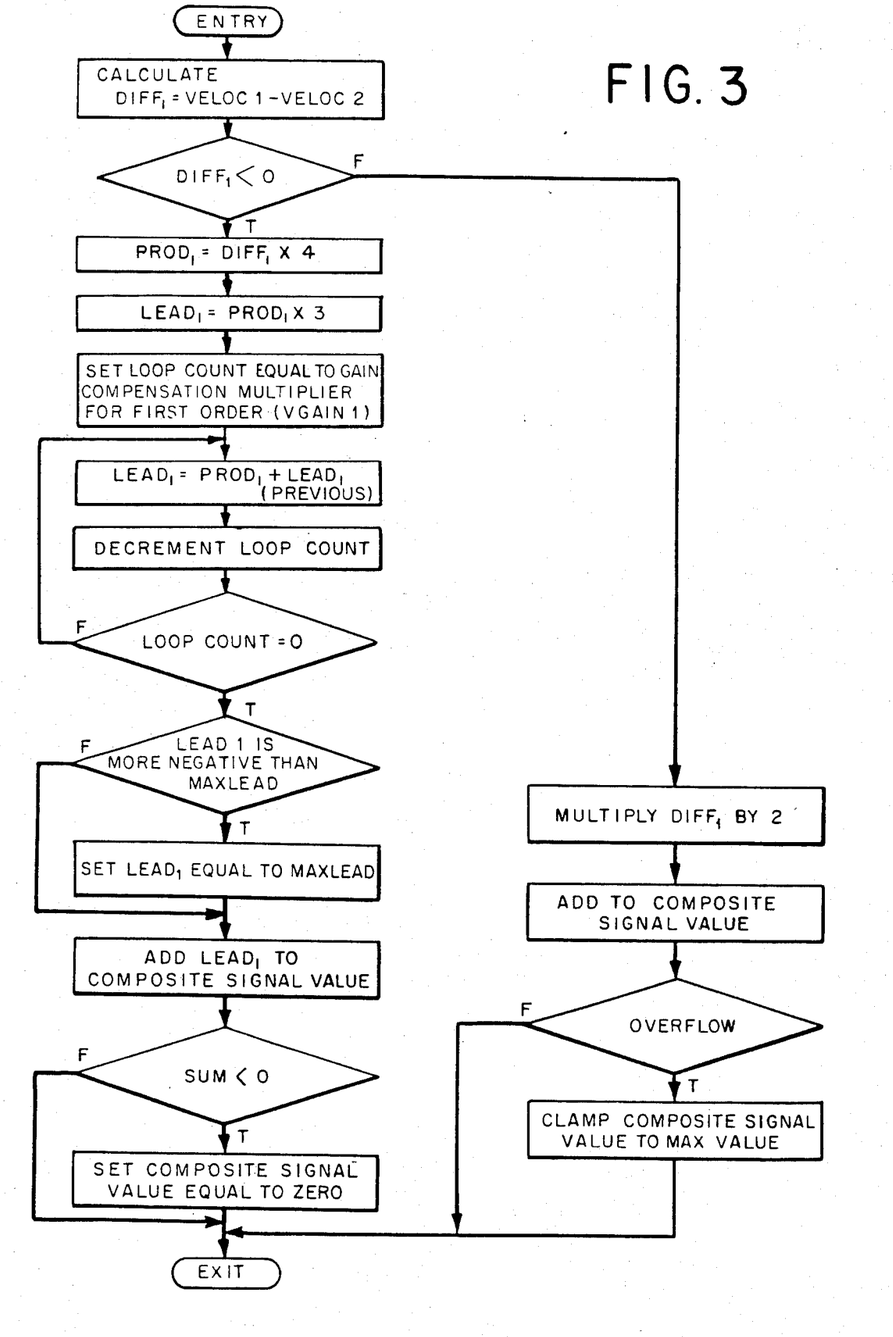
FIG. 3 is a flow chart of the first order lead portion of a first preferred embodiment of the lead network of FIG. 2.

Turning now to FIG. 3, the first order lead signal is determined as a function of VELOC1, VELOC2, and PBM. In each case, the first order difference of the wheel velocity, DIFF1, is set equal to VELOC1-VELOC2. The first order lead signal is then set equal to DIFF1 multiplied by a gain factor. The gain factor is not a constant, but instead varies as a function of the algebraic sign of DIFF1 and the magnitude of PBM.

As shown in FIG. 3, if VELOC1 is greater than VELOC2, indicating that wheelspeed is increasing, then the first order lead signal is set equal to two times DIFF1. This signal is then added to the composite signal COMPOS. The result is compared with a maximum value, and clamped to the maximum value if necessary to correct an overflow condition.

On the other hand, if VELOC2 is greater than VELOC1, indicating that wheelspeed is decreasing, then the first order lead signal is set equal to $(12+4(VGAIN1))DIFF1$, where VGAIN1 is a gain compensation multiplier for first order which will be explained in greater detail below. In addition, the first order lead signal is clamped to a maximum negative value if it is more negative than that value. The clamped first order lead signal is then added to COMPOS, the composite signal, and the result is set equal to zero if negative.

Figures 4, 5:
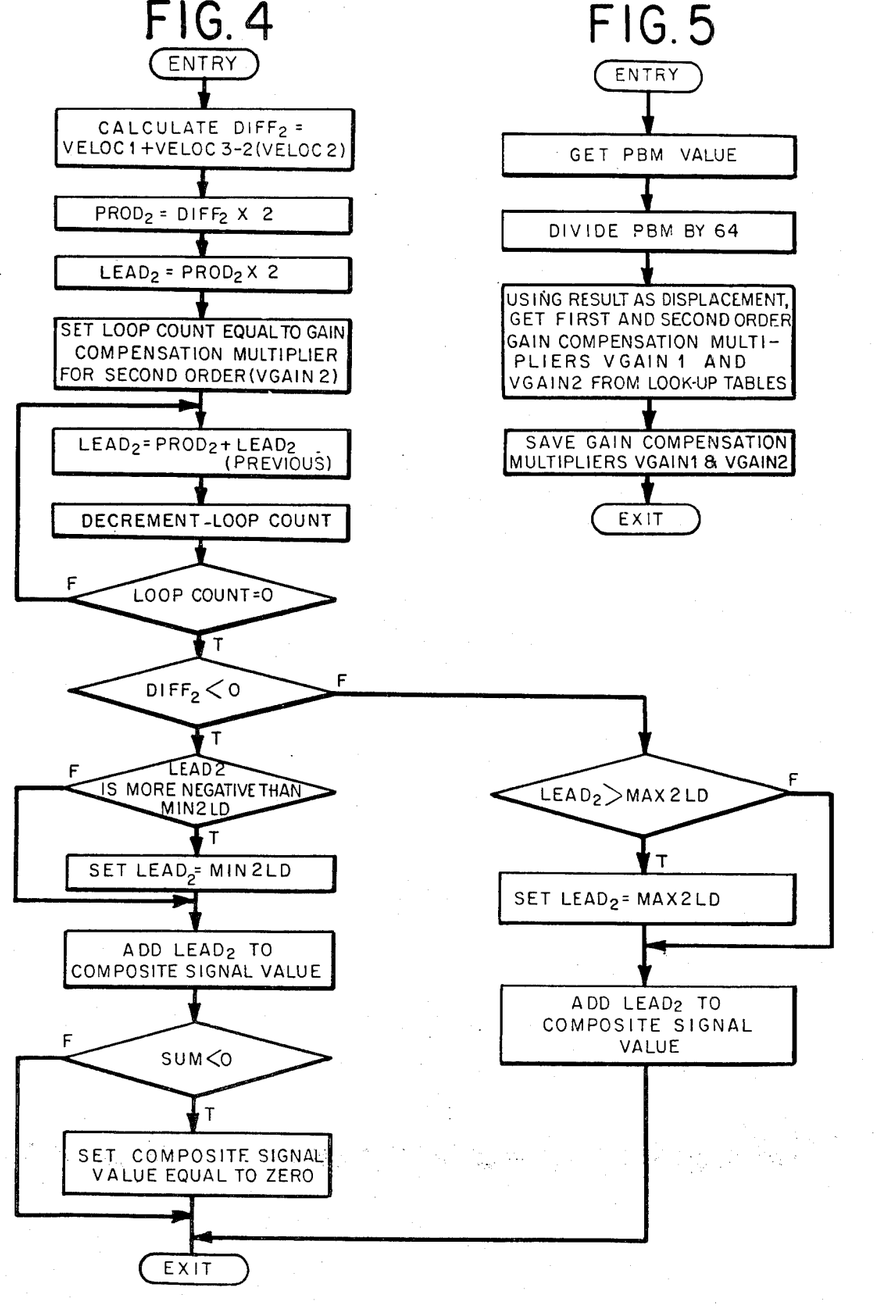
FIG. 4 is a flow chart of the second order lead portion of the first preferred embodiment of the lead network of FIG. 2.
FIG. 5 is a flow chart of the lead compensation gain routine of the first preferred embodiment of the lead network of FIG. 2.

As shown in FIG. 5, the gain compensation multiplier for first order, VGAIN1 is determined in accordance with the value of the modulator output signal PBM. PBM is divided by 64 and the quotient is used as a pointer to a lookup table, TABLE 1. Depending on the value of PBM, the variable VGAIN1 is then set equal to one of the 32 possible values stored in TABLE 1.

In general, a higher value of PBM corresponds to a higher average brake pressure and a higher value of Mu, the coefficient of friction between the tire and the pavement. In high Mu conditions the wheel can quickly enter a skid due to the high drag levels and the relatively sharp peak of the Mu-slip curve. In computer simulations, it has been found preferable to increase the gain of the lead network during high Mu conditions and to reduce gain of the lead network during low Mu conditions in order to maximize braking efficiency. As shown in Table 4, the preferred embodiment varies VGAIN1 between a low of 2 for low PBM values and a high of 10 for high PBM values.

From the foregoing, it should be apparent that the first order lead network of FIG. 3 provides a high degree of flexibility. First, the gain of the lead network is a function of the sign of DIFF1, the difference between VELOC1 and VELOC2. In this preferred embodiment, the gain is set equal to 2 for positive values of DIFF1, corresponding to an accelerating wheel, and to (12+4(VGAIN1)) for negative values of DIFF1, corresponding to a decelerating wheel. By using a higher gain for the first order lead network for negative rather than positive lead signals, this embodiment acts to reduce brake pressure more quickly than to increase brake pressure. Thus, brake pressure is reduced quickly in the face of wheel deceleration to arrest and reverse impending skids; but brake pressure is increased less quickly in the face of wheel acceleration. In computer simulation, this assymetrical gain for the first order lead network has been found to provide increased braking efficiency.

An additional feature which contributes to flexibility is the variable gain feature. First order lead gain for a decelerating wheel is equal to (12+4(VGAIN1)), and VGAIN1 varies from a low of 2 for low values of PBM (corresponding to wet or icy conditions) to a high of 10 for high values of PBM (corresponding to dry pavement). Thus, first order lead gain for a decelerating wheel is variable between 20 and 52, depending on the actual braking conditions. Of course, the actual values of VGAIN1 as a function of PBM can be chosen as necessary to optimize braking efficiency. This variable gain feature provides an important degree of flexibility that allows the antiskid system to be fine tuned to the brake system on which it is used. In this preferred embodiment it is only the gain of the lead network that varies as a function of PBM. Other portions of the antiskid system, such as the modulator 110 and the transient control unit 120, do not vary in gain with PBM, as does the lead network.

A third important feature of the embodiment of FIG. 3 is the clamp on the magnitude of the lead signal for a decelerating wheel. Because high gains are used in connection with a wheel deceleration in the first order lead networks, there is a possibility that a large deceleration could produce an unacceptably large lead signal. In order to avoid this, the lead signal is clamped to a maximum negative value if it goes more negative than the clamp value. One advantage of such a clamp is that it permits the use of high gains without creating excessively large lead signals. Such a clamped high gain lead network can respond quickly and forcefully to small variations in wheel velocity, thereby preventing incipient skids from developing into skids, and yet not introduce excessively large lead signals into the brake control signal.

FIG. 4 represents a flow chart for the second order lead network of this embodiment, which calculates the second order difference for the wheel velocity according to the formula DIFF2=VELOC1+VELOC3−2(VELOC2). The second order difference is then multiplied by a gain factor equal to (4+2(VGAIN2)), the VGAIN2 is a variable gain factor generated by the program of FIG. 5. In this preferred embodiment, VGAIN2 is determined in the same manner as VGAIN1 except that a separate lookup table, TABLE 3, is used. VGAIN2 varies between 2 and 10 depending on the value of PBM. Thus, the gain factor for the second order lead ranges between 8 and 24. In contrast to the first order lead of FIG. 3, the second order lead of FIG. 4 employs the same gain factor for both accelerating and decelerating wheel conditions.

The program then branches, depending on the sign of DIFF2. If DIFF2 is positive, the lead signal is clamped to a greatest positive level and added to the composite signal. If DIFF2 is negative, the lead signal is clamped to a greatest negative level and added to the composite signal.

The second order lead of FIG. 4 embodies the variable gain feature and the clamp feature of the first order lead discussed above. Though VGAIN2 is equal to VGAIN1 in this preferred embodiment, it could easily be made to vary with PBM in a manner different from VGAIN1 by altering the contents of the appropriate lookup table.

The programs of FIGS. 3, 4 and 5 are listed in assembly language form in Tables 1, 2, 3 and 4. Table 1 corresponds to the program of FIG. 3; Table 2 corresponds to the program of FIG. 4; Table 3 corresponds to the program of FIG. 5; and Table 4 lists variables and constants used in the listings of Tables 1, 2 and 3. In order to better understand these listings, it should be understood that the wheel speed measurements stored in VELOC1 through VELOC3 are stored as sixteen bit binary numbers scaled to 0.1 foot per second per least significant bit. Preferably, these velocity measurements are updated 203 times per second, and the programs of Tables 1, 2 and 3 are executed after each update of VELOC1 through VELOC3.

In addition, the variable PBM is directly related to brake pressure and inversely related to valve current. The relationship is linear, scaled such that full scale PBM current (47 milliamps in this embodiment) corresponds to a PBM value of 1280 (hexadecimal) and zero valve current corresponds to a PBM value of 7FFF (hexadecimal). The foregoing examples of specific valve currents are given in terms of valve currents applied to a valve such as the antiskid valve described in U.S. Pat. No. 4,130,322. The constants MAXLEAD, MAX2LD, and MIN2LD are similarly related to valve current, except that the scale factor is chosen such that MAXLEAD corresponds to a valve current reduction of 10.3 mA; MAX2LD corresponds to a valve current reduction of 20.6 mA; and MIN2LD corresponds to a valve current increase of 20.6 mA.

ADDITIONAL PREFERRED EMBODIMENTS

Tables V through VII provide an assembly language listing of a second preferred embodiment of the apparatus of this invention for generating a lead signal. This second preferred embodiment operates in a similar manner to the first in that the lead signal is a function of a gain factor, which is itself a function of the magnitude of the modulated brake control signal PBM.

In this second preferred embodiment, VELOC1 and VELOC2 are scaled as described above. As before, VELOC1 is the most recent measurement of wheel speed and VELOC2 is the immediately previous measurement of wheel speed, made about 5 milliseconds before VELOC1. In this embodiment, PBM is a 16 bit variable which ranges between O and ODOO (HEX) and PBM is correlated linearly with modulator valve current such that a PBM value of 0 corresponds to zero modulator valve current and a PBM valve of ODOO (HEX) corresponds to a modulator valve current of 45 milliamps. The lead signal generated by the program of Table V is stored in the DE register when the program returns; this lead signal is then added to PBM to provide lead compensation. This embodiment is adapted for execution at 5 millisecond intervals on a Z-80 microprocessor, as was the first preferred embodiment described above. This second embodiment is described in greater detail in a co-pending U.S. patent application Ser. No. 408,864 entitled "Apparatus for Generating a Lead Signal in an Antiskid System," filed Aug. 17, 1982, and assigned to the assignee of the present invention.

Both of the embodiments described above use the modulated brake control signal to determine the lead gain factor. As explained above, it has been found desirable to utilize a gain factor for the lead network which, under severe braking conditions, varies as a function of the currently prevailing coefficient of braking. In the second embodiment of Tables V–VII, severe braking at high coefficients of braking (e.g. a dry runway) results in low values of PBM and therefore in gain factors selected from the low address portion of the gain table. Similarly, severe braking at low coefficients of braking (e.g. a wet or snow-packed runway) results in high values of PBM and therefore in gain factors selected from the high address portion of the gain table.

Figure 6:
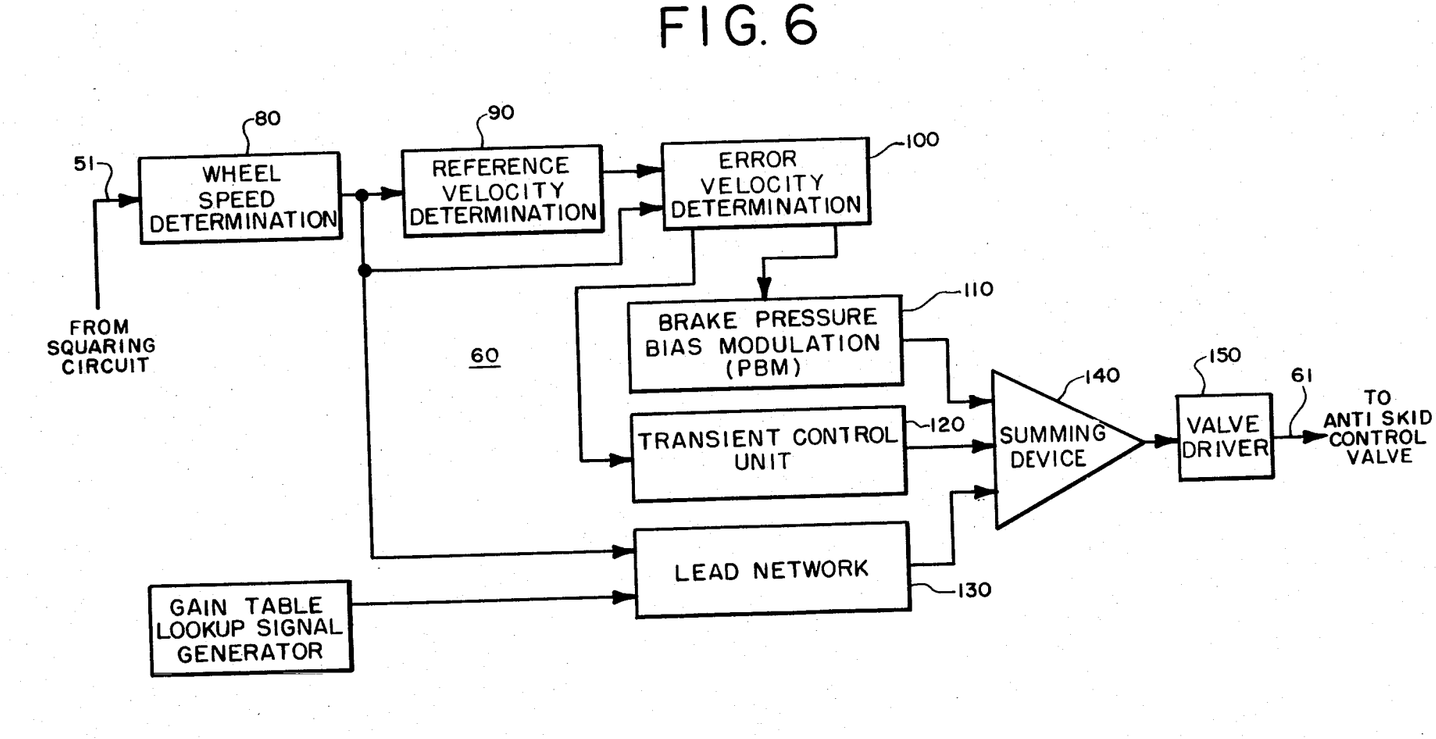
FIG. 6 is a detailed block diagram of the functional components of an antiskid control system which incorporates an alternative preferred embodiment of this invention.

It will be readily appreciated that alternate embodiments of this invention can be constructed along the lines of the block diagram of FIG. 6, which do not rely on the variable PBM to select the gain factor for the lead network. As shown in FIG. 6, a gain table lookup signal generator can be provided and coupled to the lead network to designate the gain factor. In alternative forms of the system of FIG. 6, the lookup signal generator can operate to generate a lookup signal which is a function of a parameter such as average wheel deceleration, aircraft deceleration, or brake torque to discriminate between conditions of high and low braking coefficients during severe braking. Thus, for example, if average wheel deceleration is used, the lookup signal generator can be responsive to the wheel speed determination unit 80, and can even be included in the reference velocity determination unit 90. If aircraft deceleration is used, the lookup signal generator can be made responsive to an inertial accelerometer. If brake torque is used, the lookup signal generator can include a strain gauge mounted on the brake coupling rod of the brake 20 to measure brake torque. A separate lookup signal generator can be provided for the lead network for each braked wheel, or a common lookup signal generator can be used for a number of braked wheels.

Whatever the nature of the particular lookup signal generator used, it should provide a lookup signal to the lead network which varies as a function of the braking coefficient under severe braking. For example, if the listing of Table V were to be adapted for use with a lookup signal generator of the type described above, the lookup signal generator should act to generate a digital signal between zero (during severe braking conditions at high braking coefficients) and 14 (during severe braking conditions at low braking coefficients). This digital signal would then be used similarly to the high order byte of PBM in the manner described above to retrieve the appropriate gain factor from the gain table. Of course, alternative embodiments may be adapted for use with lookup signals having other polarities or ranges, and other approaches than lookup tables can be used to generate a gain factor for the lead network 130 which varies as a function of the braking coefficient under severe braking.

In the preferred embodiments described above, the first and second order differences have been used as an approximation of the first and second time derivatives, respectively, of the wheel speed signal. In digital systems it is often preferable to use differences rather than derivatives. However, the novel features of the present invention can also be advantageously used with time derivatives. In the following claims the term time derivative is used in its generic sense and is meant to include approximations of derivatives such as differences.

Of course, it should be understood that various changes and modifications of the preferred embodiments described above will be apparent to those skilled in the art. For example, gains and clamp values can be changed and other antiskid systems, such as acceleration based systems, can be substituted for the velocity based antiskid system shown. It is therefore intended that the foregoing detailed description be regarded as illustrative rather than limiting, and that it be understood that it is the following claims, including all equivalents, which are intended to define the scope of this invention.

TABLE I

```
        FIRST ORDER LEAD
        **********************

LEAD1X  LD DE,(VELOC2)
        LD HL,(VELOC1)
        XOR A
        SBC HL,DE
        JR NC,LEAD1A
        ADD HL,HL
        ADD HL,HL
        LD D,H
        LD E,L
        ADD HL,HL
        ADD HL,DE
        LD B,(IY+VGAIN1-RAM); GET MULTIPLIER
        FOR GAIN COMP.
LEAD1C  ADD HL,DE
        DJNZ LEAD1C
        LD A,MAXLEAD ; CLAMP IF LEAD IS TOO
        BIG
        CP H
        JR C,LEAD1D
        LD HL,MAXLEAD*256
LEAD1D  LD BC,(COMPOS); GET COMPOSITE SIGNAL
        VALUE
        ADD HL,BC
        JR C,LEAD1B
        LD HL,0
        JR LEAD1B
LEAD1A  LD D,H
```

TABLE I-continued

```
            LD E,L
            ADD HL,DE
            LD BC,(COMPOS)
            ADD HL,BC
            JR NC,LEAD1B
            LD HL,OFFFH
LEAD1B      LD B,H
            LD C,L
            RET
;
```

TABLE II

```
;
;           SECOND ORDER LEAD
;           ************************
;
LEAD2X      LD HL,(VELOC1); GET NEW VELOCITY
            LD DE,(VELOC3); GET OLD VELOCITY
            ADD HL,DE
            LD DE,(VELOC2)
            XOR A; CLEAR CARRY
            SBC HL,DE
            XOR A
            SBC HL,DE
            PUSH AF; SAVE FLAGS
            ADD HL,HL
            LD D,H
            LD E,L
            ADD HL,HL
            PUSH BC
            LD B,(IY+VGAIN2-RAM)
LEAD2B      ADD HL,DE
            DJNZ LEAD2B
            POP BC
            POP AF
            JR C,LEAD2A
            LD A, MAX2LD; CLAMP VALUE
            CP H
            JR NC,LEAD2C; SKIP IF LESS
            LD HL,MAX2LD*256
LEAD2C      ADD HL,BC
            JR LEAD2E
LEAD2A      LD A,MIN2LD; MINIMUM CLAMP
```

TABLE II-continued

```
            CP H
            JR C,LEAD2D
            LD HL,MIN2LD*256
LEAD2D      ADD HL,BC
            JR C,LEAD2E
            LD HL,0
LEAD2E      RET
;
```

TABLE III

```
;
;           LEAD GAIN COMPENSATION
;           ******************************
;
TORQX:      LD DE,(PBM)
            SRL D
            SRL D
            LD HL,TABLE1
            LD E,D
            LD D,0
            ADD HL,DE
            LD A,(HL)
            LD (VGAIN1),A
            LD HL,TABLE3
            ADD HL,DE
            LD A,(HL)
            LD (VGAIN2),A
            RET
;
```

TABLE IV

```
;
;           FIRST ORDER LEAD
;           VARIABLE GAIN
;           LOOKUP TABLE
;           *********************
;
TABLE 1     BYTE 2,2,2,2,2,3,3,3,4,4,4,4
            BYTE 5,5,5,5,8,8,8,8,10,10,10,10,10
            BYTE 10,10,10,10,10,10,10

;           SECOND ORDER LEAD
;           VARIABLE GAIN
;           LOOKUP TABLE
;           ************************
;
TABLE3      BYTE 2,2,2,2,2,3,3,3,4,4,4,4
            BYTE 5,5,5,5,8,8,8,8,10,10,10,10,10
            BYTE 10,10,10,10,10,10,10

;           GENERAL CONSTANTS
;           ***************************
;
MAXLEAD     EQU 0FDH ; CLAMP FOR LEAD VALUE
            (10 MA PRESS REDUCTION)
MAX2LD      EQU 6; MAX CLAMP FOR 2ND LEAD
            (21 MA)
MIN2LD      EQU −6; MIN CLAMP FOR 2ND LEAD
            (−21 MA)
```

TABLE IV-continued

```
;
;       RAM
;       *****
;
VELOC1  EQU 820H; NEW VELOCITY
VELOC2  EQU 822H; PREVIOUS VELOCITY (ONE
        LOOP TIME BACK)
VELOC3  EQU 824H; PREVIOUS VELOCITY TWO
        LOOP TIMES BACK)
VGAIN1  EQU 817H; FIRST ORDER GAIN
        COMPENSATION MULTIPLIER
VGAIN2  EQU 81DH; SECOND ORDER GAIN
        COMPENSATION MULTIPLIER
RAM     EQU 800H; BEGINNING OF RAM
PBM     EQU 80AH; PBM VALUE (TWO BYTES)
COMPOS  EQU 812H; COMPOSITE VALUE (TWO
        BYTES)
;
```

TABLE V

LEAD ROUTINE

```
COMPENSX    CALL VELOCX
            OR A
            JR NZ,COMPENSC
            LD HL,(DELTA1)
            LD (DELTA2),HL
            LD HL,(VELOC2)
            LD DE,(VELOC1)
            LD (VELOC2),DE
            OR A
            SBC HL,DE
            LD A,(NEWFLAG)
            OR A
            JR Z,COMPENSD
            SRA H
            RR L
            SRA H
            RR L
COMPENSD    LD (DELTA1),HL
            XOR A
COMPENSC    LD (NEWFLAG),A
            LD A,(PBM+1)
            LD L,A
            LD H,O
            LD DE,GAINTABL
            ADD HL,DE
            LD A,(HL)
            LD HL,(PRICLAMP)
            LD BC,PRISTEP
            ADD HL,BC
            EX DE,HL
            LD HL,(DELTA1)
            CALL CLAMPX
            LD DE,MAXCOMP
            CALL CLAMPX
            LD (PRICLAMP),HL
            LD B,H
            LD C,L
            LD HL,(DELTA1)
            LD DE,(DELTA2)
            OR A
            SBC HL,DE
            ADD HL,HL
            LD DE,SECCLAMP
            CALL CLAMPX
            OR A
            SBC HL,BC
            ADD HL,BC
            JR NC,COMPENSE
            LD H,B
            LD L,C
COMPENSE    ADD HL,HL
            CALL MULTI5X
            EX DE,HL
COMPENSZ    RET
;
;           PHASE COMPENSATION GAIN TABLE
;           *********************************************
```

TABLE V-continued

LEAD ROUTINE

```
;
GAINTABL    BYTE 17
            BYTE 17
            BYTE 17
            BYTE 17
            BYTE 17
            BYTE 13
            BYTE 11
            BYTE 9
            BYTE 7
            BYTE 5
            BYTE 4
            BYTE 4
            BYTE 4
            BYTE 4
            BYTE 4
            BYTE 4
;
MAXCOMP     EQU 20H
PRISTEP     EQU 5
SECCLAMP    EQU 10H
```

TABLE VI

MULTIPLY ROUTINE

```
MULTI5X     EX DE,HL
            LD B,5
            LD HL,O
            ADD A,A
            ADD A,A
            ADD A,A
MULTI5A     ADD HL,HL
            ADD A,A
            JR NC,MULTI5B
            ADD HL,DE
MULTI5B     DJNZ MULTI5A
MULTI5Z     RET
```

TABLE VII

CLAMP ROUTINE

```
CLAMPX      BIT 7,H
            JR Z,CLAMP1
            LD HL,O
            JR CLAMPZ
CLAMP1      CP A
            SBC HL,DE
            ADD HL,DE
            JR C,CLAMPZ
            EX DE,HL
CLAMPZ      RET
```

I claim:

1. In an antiskid system including a wheel, a brake coupled to the wheel, means for generating a wheel signal indicative of a selected time derivative of the rotational position of the wheel, modulator means responsive to the wheel signal for generating a modulator output signal as a time integral function of the wheel signal, and means responsive to the modulator output signal for reducing braking action of the brake, the improvement comprising:

means for generating an input signal indicative of a predetermined time derivative of the angular velocity of the wheel, said predetermined time derivative of angular velocity corresponding to a higher order time derivative of the rotational position of the wheel than the selected time derivative of the rotational position of the wheel;

means, responsive to the modulator output signal, for generating a gain factor as a function of the modulator output signal such that the gain factor is set to a first gain value when the modulator output signal is within a first range of values, and to a second gain value, higher than the first gain value, when the modulator output signal is within a second range of values indicative of a lesser reduction of braking action than the first range of values;

means for generating a lead signal as a function of the gain factor and the input signal; and means for modifying the modulator output signal as a function of the lead signal to provide lead compensation;

said modulator having a gain independent of said gain factor.

2. The improvement of claim 1 wherein the means for generating a gain factor comprises:

a computer;

means, included in the computer, for storing a look up table which includes the first and second gain values; and means, included in the computer, for selectively retrieving one of the first and second gain values from the look up table in response to the amplitude of the modulator output signal.

3. The improvement of claim 1 or 2 wherein the ratio between the second gain value and the first gain value is about five to one.

4. The improvement of claim 2 wherein the look up table includes about thirty additional gain values in addition to the first and second gain values, and the retrieving means operates to retrieve any one of the gain values stored in the look up table in response to the amplitude of the modulator output signal.

5. In an antiskid system including a wheel, a brake coupled to the wheel, means for generating a wheel signal indicative of wheel rotation, circuit means, responsive to the wheel signal, for generating an output signal as a function of a selected time derivative of the rotational position of the wheel, and means responsive to the output signal for reducing braking action of the brake, the improvement comprising:

means for generating an input signal indicative of a predetermined time derivative of the rotational position of the wheel, said predetermined time derivative corresponding to a higher order time derivative of the rotational position of the wheel than the selected time derivative of the rotational position of the wheel;

means, responsive to the output signal, for generating a gain factor as a function of the output signal such that the gain factor is set at a first, higher gain value in response to a first value of the output signal and the gain factor is set at a second, lower gain value in response to a second value of the output signal, said second value of the output signal corresponding to a greater reduction in braking action than said first value of the output signal;

means for generating a lead signal as a function of the gain factor and the input signal; and means for modifying the output signal as a function of the lead signal to provide lead compensation;

said circuit means having a gain independent of said gain factor.

6. The improvement of claim 5 wherein the means for generating a gain factor comprises:

a computer;

means, included in the computer, for storing a look up table which includes the first and second gain values; and means, also included in the computer, for selectively retrieving one of the first and second gain values from the look up table in response to the amplitude of the output signal.

7. The improvement of claim 6 wherein the input signal is indicative of the first time derivative of the angular velocity of the wheel.

8. The improvement of claim 6 wherein the look up table includes about thirty additional gain values in addition to the first and second gain values, and the retrieving means operates to retrieve any one of the gain values stored in the look up table in response to the amplitude of the output signal.

9. The improvement of claim 6 wherein the input signal is indicative of the second time derivative of the angular velocity of the wheel.

10. The improvement of claim 1 or 5 wherein the means for generating the lead signal operates to generate the lead signal as a function of the product of the gain factor and the input signal.

11. The improvement of claim 10 wherein the means for generating the lead signal operates to generate the lead signal such that the lead signal is substantially equal to zero only when the predetermined time derivative is substantially equal to zero.

12. In an antiskid system including a wheel adapted to contact a support surface, a brake coupled to the wheel, means for generating a wheel signal indicative of wheel rotation, circuit means, responsive to the wheel signal, for generating an output signal as a function of a selected time derivative of the rotational position of the wheel, and means responsive to the output signal for reducing braking action of the brake, the improvement comprising:

means for generating an input signal indicative of a predetermined time derivative of the rotational position of the wheel, said predetermined time derivative corresponding to a higher order time derivative of the rotational position of the wheel than the selected time derivative of the rotational position of the wheel;

means for generating a gain factor as a function of a first signal which varies with the coefficient of friction between the wheel and the support surface during severe braking such that the gain factor is set at a first, higher gain value in response to a first value of the first signal and the gain factor is set at a second, lower gain value in response to a second value of the first signal, said first value of the first signal associated with a greater value of the coefficient of friction than said second value of the first signal;

means for generating a lead signal as a function of the gain factor and the input signal; and means for modifying the output signal as a function of the lead signal to provide lead compensation;

said circuit means having a gain independent of said gain factor.

13. The improvement of claim 12 wherein the means for generating a gain factor comprises:

a computer;

means, included in the computer, for storing a look up table which includes at least the first and second gain values; and means, also included in the computer, for selectively retrieving one of the first and second gain values from the look up table in response to the first signal.

14. The improvement of claim 13 wherein the input signal is indicative of the first time derivative of the angular velocity of the wheel.

15. The improvement of claim 13 wherein the look up table includes at least ten additional gain values in addition to the first and second gain values, and the retrieving means operates to retrieve any one of the gain values stored in the look up table in response to the amplitude of the first signal.

16. The improvement of claim 13 wherein the input signal is indicative of the second time derivative of the angular velocity of the wheel.

17. The improvement of claim 12 wherein the means for generating the lead signal operates to generate the lead signal as a function of the product of the gain factor and the input signal.

18. The improvement of claim 17 wherein the means for generating the lead signal operates to generate the lead signal such that the lead signal is substantially equal to zero only when the predetermined time derivative is substantially equal to zero.

19. The improvement of claim 12 wherein the invention further comprises:

means for generating a second signal as a function of measured torque of the brake; and means for supplying the second signal to the gain factor generating means as the first signal.

20. The improvement of claim 12 wherein the invention further comprises:

means for generating a second signal as a function of measured deceleration of the wheel; and means for supplying the second signal to the gain factor generating means as the first signal.

21. The improvement of claim 12 wherein the wheel is mounted on a vehicle and wherein the invention further comprises:

means for generating a second signal as a function of measured deceleration of the vehicle; and means for supplying the second signal to the gain factor generating means as the first signal.

* * * * *